United States Patent Office 3,264,329
Patented August 2, 1966

3,264,329
PROCESS FOR PREPARING 4-HYDROXY-3-KETO-5α-STEROIDS AND ETHERS OF 3-HYDROXY-Δ³-5α-STEROIDS INTERMEDIATES THEREIN
Alberto Ercoli and Rinaldo Gardi, Milan, Italy, assignors to Francesco Vismara S.p.A., Casatenovo (Como), Italy
No Drawing. Filed Nov. 26, 1962, Ser. No. 240,143
Claims priority, application Italy, Nov. 27, 1961, 21,283/61
8 Claims. (Cl. 260—397.4)

The present invention relates to new steroid compounds and is more particularly concerned with the new ethers of 3-hydroxy-Δ³-5α-steroids and to a process for their preparation.

It is known to prepare enolethers of 3-keto-5α-steroids from the enolethers of the corresponding Δ⁴-3-ketones (ethers of 3-hydroxy-3,5-dienes). This conversion is accomplished by catalytic hydrogenation of the starting compounds with a calculated amount of hydrogen, in order to hydrogenate only the double bond in the 5-position of the Δ³,⁵-diene system. The so obtained enolethers of 3-keto-5α-steroids are identical to the products prepared by pyrolysis of the diacetals of 3-saturated ketones which compounds are characterized by having a double bond in the 2:3 position. The Δ²-structure has been confirmed following many procedures and is till now the only known structure for the enolethers of 3-keto-5α-steroids (Fieser, Steroids, pp. 310–311).

It has now been found that carrying out the catalytic hydrogenation of the enolethers of Δ⁴-3-ketosteroids in the presence of a catalytic amount of a basic substance, new enolethers of 3-keto-5α-steroids are obtained with a Δ³-structure. Accordingly, the invention provides a process for the preparation of ethers of 3-hydroxy-Δ³-5α-steroids from the enolethers of the corresponding Δ⁴-3-ketones by catalytic hydrogenation in the presence of a catalytic amount of a basic substance, such as an organic or inorganic base.

The process of the present invention can be generally applied to the enolethers of Δ⁴-3-ketosteroids and 19-nor-steroids of the androstane, pregnane and cholestane series, in order to obtain the corresponding ethers of 3-hydroxy-Δ³-5α-steroids and 19-nor-steroids.

The new compounds of this invention may be represented by the following general formula:

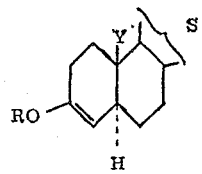

where S completes the steroid nucleus, Y represents methyl or hydrogen and R represents a hydrocarbon radical selected from aliphatic hydrocarbon radicals, containing from one to ten carbon atoms, cycloaliphatic hydrocarbon radicals containing from four to seven carbon atoms, benzyl and aryl radicals.

Many of the new compounds of this invention possess useful biological properties. In particular, the compounds of the following formula:

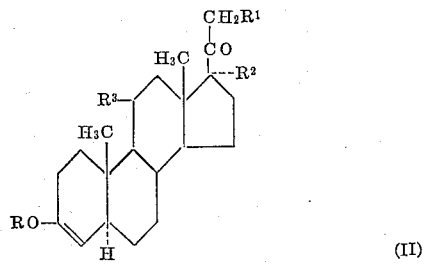

(where R is as defined above, $R^1$ is hydrogen, a hydroxy group or an acyloxy group derived from a lower alkanoic acid containing 1–7 carbon atoms, $R^2$ is hydrogen, a hydroxy or an acetoxy group and $R^3$ is hydrogen, a β-hydroxy group or ketonic oxygen) possess hypnotic and analgesic activity and also show anti-aldosterone property.

Further, the compounds of the following formula:

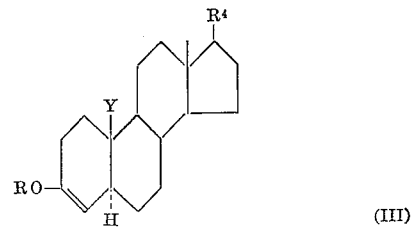

(where R represents an aliphatic hydrocarbon radical from five to ten carbon atoms, or a cycloaliphatic hydrocarbon radical from four to seven carbon atoms, Y is hydrogen or methyl and $R^4$ represents a ketonic oxygen or a grouping

in which X is hydrogen or the acyl residue of a lower alkanoic acid and $R^5$ represents hydrogen or a lower hydrocarbon radical containing from one to three carbon atoms) possess antigonadrotopic and antihypophysary activity and are useful to induce a decrease of hypophysis hormonal secretion.

Further, the new ethers of 3-hydroxy-Δ³-5α-steroids and 19-nor-steroids are useful intermediates for the preparation of 4-hydroxy-3-keto-5α-steroids.

The prior art discloses 4-hydroxy derivatives of Δ⁴-3-keto-steroids and also discloses methods for preparing Δ⁴-3-ketones hydroxylated at the 6-position (Journal Organic Chemistry 19, 1509; 1954, and 26, 974; 1961), but no disclosure is known of the 4-hydroxy-3-keto-5α-steroids and no method has been heretofore developed for introducing a hydroxy group into the 4-position of saturated 3-ketosteroids.

According to the present invention, the 4-hydroxy-3-keto-5α-steroids are now available by treating the ethers of 3-hydroxy-Δ³-5α-steroids with a peracid. Therefore, the process of this invention comprises hydrogenating the enolethers of Δ⁴-3-ketosteroids in the presence of a basic substance, isolating the resulting ethers of 3-hydroxy-Δ³-5α-steroids and converting said intermediates to 3-keto-4-hydroxy-5α-saturated derivatives by a peracid treatment.

In applying practically the process of this invention the starting materials, enolethers of Δ⁴-3-ketones, are reduced by catalytic hydrogenation with a calculated amount of hydrogen (a mole of hydrogen for each mole of the starting enolether), in the presence of a catalytic amount of a basic substance. Suitable basic substances are organic bases such as pyridine, piperidine, alkylamines, for instance, ethylamine, diethylamine, triethylamine, inorganic bases such as sodium, potassium or ammonium hydroxide, organic or inorganic salts with basic properties such as, for example, sodium acetate or sodium phosphate.

The catalytic hydrogenation is usually carried out at room temperature (from +5 to +30° C.) in solution in an inert organic solvent and in the presence also of a suitable catalyst such as nickel, platinum and palladium supported on an inert material, for instance barium sulfate, calcium carbonate, alumina, diatomaceous earth and the like. Palladium on calcium carbonate is the preferred catalyst. Suitable solvents for the catalytic hydrogenations are alcohols, dioxan, tetrahydrofuran, benzene, hexane and dimethylformamide.

The hydrogenation step is over when a mole of hydrogen has been consumed for each mole of the 3-enolether reacted. The resulting ether of 3-hydroxy-$\Delta^3$-5α-steroid is then isolated from the reaction mixture by filtration, evaporation of the solvent to dryness and purification of the residue by crystallization. If desired, the solution containing the ether of the 3-hydroxy-$\Delta^3$-5α-steroid can be directly employed for the further transformation.

The ethers of 3-hydroxy-$\Delta^3$-5α-steroids and 19-norsteroids of the androstane, pregnane and cholestane series, are converted to the corresponding 4-hydroxy-3-keto-5α-steroids by treatment with a peracid such as performic, peracetic, perbenzoic or monoperphthalic acid or with hydrogen peroxide. Although any ether can be used as intermediate in said conversion, it is preferred using a lower alkyl ether such as, for example, methyl or ethyl. The reaction is usually carried out in solution in an inert organic solvent and at a temperature between 0° and 30° C. Suitable inert organic solvents are, for example, benzene, toluene, hexane, petroleum ether, methylene chloride or chloroform. Ethers, such as dioxan, tetrahydrofuran or diethyl ether can also be employed as solvents.

The compounds obtained at the end of the treatment are a mixture of the 4α and 4β-isomers of the 4-hydroxy-3-keto-5α-steroid and the mixture is separated into its components by chromatography or on fractional crystallization. The yield in 4-hydroxy-3-keto-5α-steroid is often higher than 80% of the theoretical amount.

The enolethers of $\Delta^4$-3-ketosteroids used as starting material for the process of this invention are generally well known. They can be prepared by treatment of the $\Delta^4$-3-ketone with an alkyl orthoformate or with the appropriate alcohol according to known procedures. The higher aliphatic and the cycloaliphatic enolethers may also be obtained from the corresponding ethyl enolether by treatment with the appropriate aliphatic or cycloaliphatic alcohol according to an exchange reaction as disclosed in the U.S. Patent No. 3,019,241.

The following examples serve to illustrate the methods for the preparation of the new compounds but they are not to be regarded as limiting the invention.

*Example 1*

0.2 g. of PdO supported on alumina (2% in Pd), suspended in 4 cc. of methanol, are treated with hydrogen to reduce the PdO to free palladium. Then a solution of 1 g. of 3-cyclopentyl enolether of testosterone in a mixture of 10 cc. of tetrahydrofuran and 2 cc. of methanol, containing a drop (about 0.04 cc.) of pyridine, is added. The reaction mixture is hydrogenated at room temperature and at atmospheric pressure until hydrogen is consumed in the ratio of one mole for each mole of the starting material. The catalyst is filtered off and the mixture is concentrated under vacuum. The residue, after crystallization from methanol consists of 3-cyclopentyloxy-$\Delta^3$-5α-androstene-17β-ol, M. Pt. 127–129° C.; $[\alpha]_D = +11°$ (dioxan).

This new compound differs from the isomeric 3-cyclopentyloxy-$\Delta^2$-5α-androstene-17β-ol, described in the Example 1 of our copending U.S. application Serial No. 124,385, filed on July 17, 1961, and now U.S. Patent No. 3,118,917, by a lower value for the specific rotation.

The $\Delta^3$-structure for the 3-cyclopentyloxy-$\Delta^3$-5α-androstene-17β-ol, as well as for the other 3-hydroxy-$\Delta^3$-5α-steriod ethers described in the successive examples, has been unequivocally proved.

The 3-hydroxy-$\Delta^3$-5α-steroid ethers show a lower rotation than the corresponding ethers of 3-hydroxy-$\Delta^2$-5α-steroid isomers. Furthermore, the ethers of 3-hydroxy-$\Delta^3$-5α-steroids by reaction with N-bromosuccinimide or N-chlorosuccinimide yield the corresponding 4-bromo or 4-chloro-3-keto-5α-steroids, respectively, which proves that the 4-position of the molecule is activated because of the presence of a double bond 3:4 position.

*Example 2*

A solution of 1 g. of 3-cyclopentyloxy-$\Delta^3$-5α-androstene-17β-ol in 20 cc. of anhydrous ether is treated with 12 cc. of a 0.3 N solution of monoperphthalic acid in ether. The reaction mixture is left standing over night at 10° C. After washing the reaction mixture with aqueous sodium carbonate and with water, the ethereal solution is dried over sodium sulfate and then concentrated under vacuum. The residue consists of a mixture of 4α and 4β-isomers of 4,17β-dihydroxy-5α-androstane-3-one. By repeated recrystallizations from ether-hexane there are separated 4α and 4β-isomers. The pure 5α-androstane-4α,17β-diol-3-one shows melting point 193–195° C.; $[\alpha]_D = +51°$ (chloroform).

*Example 3*

After reducing with hydrogen 0.2 g. of PdO on calcium carbonate suspended in 5 cc. of ethanol, 1 g. of 3-ethyl enolether of testosterone, dissolved in a mixture of 10 cc. of tetrahydrofuran and 3 cc. of methanol is added to the suspension of the catalyst. Two drops of pyridine are added and the mixture is hydrogenated at room temperature as in Example 1 to give 3-ethoxy-$\Delta^3$-5α-androstene-17β-ol, M. Pt. 90–95° C.; $[\alpha]_D = +28°$ (dioxan 0.3%). In the same manner as above, 3-octyloxy-$\Delta^3$-5α-androstene-17β-ol is obtained, M. Pt. 69–71° C.; $[\alpha]_D = +10°$ (dioxan 0.3%).

Following the procedure of Example 2, the 3-ethoxy ether is converted to a mixture of 5α-androstane-4α,17β-diol-3-one and 5α-androstane-4β,17β-diol-3-one and the 4α and 4β-isomers are isolated.

*Example 4*

1.5 g. of 3-ethyl enolether of testosterone acetate is dissolved in a solution of 12 cc. of tetrahydrofuran and 3 cc. of methanol. After adding a few drops of ethylamine, the reaction mixture is treated with hydrogen at room temperature, in the presence of 0.2 g. of palladium on calcium carbonate to give 3-ethoxy-$\Delta^3$-5α-androstene-17β-ol-acetate, M. Pt. 111–114° C.; $[\alpha]_D = +3°$ (dioxan 0.3%). Likewise, starting from the corresponding 3-enolethers of testosterone acetate the following new compounds are prepared:

3-methoxy-$\Delta^3$-5α-androstene-17β-ol-acetate, M. Pt. 117–120° C.; $[\alpha]_D = +1.5°$ (dioxan 0.3%);
3-cyclopentyloxy-$\Delta^3$-5α-androstene-17β-ol-acetate, M. Pt. 101–104° C.; $[\alpha]_D = +2.5°$ (dioxan 0.3%);
3-octyloxy-$\Delta^3$-5α-androstene-17β-ol-acetate, M. Pt. 79–80° C.; $[\alpha]_D = +1.5°$ (dioxan 0.3%)

1 g. of 3-ethoxy-$\Delta^3$-5α-androstene-17β-ol-acetate, dissolved in 20 cc. of anhydrous ether, is treated with 0.3 N solution of monoperphthalic acid in ether, according to the procedure of Example 2. There is obtained 700 mg. of residue which, after repeated recrystallizations from ether-hexane, gives 5α-androstane-4α,17β-diol-3-one 17-acetate, M. Pt. 191–195° C.; $[\alpha]_D = -9°$ (chloroform).

*Example 5*

10 mg. of sodium hydroxide previously dissolved in 10 cc. of methanol are added to a solution of 5 g. of cyclopentyl enolether of testosterone propionate in 50 cc. of tetrahydrofuran. The obtained mixture is hydrogenated in the presence of 1 g. of palladium on alumina (about 2%) in methanol solution, to give 3-cyclopentyloxy-$\Delta^3$-5α-androstene-17β-ol propionate, M. Pt. 91.5–92.5° C.; $[\alpha]_D = -10°$ (dioxan 0.5%).

By treating this compound with 0.2 N solution of peracetic acid in tetrahydrofuran, there is obtained the 4α and 4β-isomers of 5α-androstane-4,17β-diol-3-one 17-propionate.

*Example 6*

By substituting an equivalent quantity of 3-ethyl enolether of $\Delta^4$-androstene-3,17-dione in the process of Example 5, 3-ethoxy-Δ³-5α-androstene-17-one is obtained, M. Pt. 128–131° C.; [α]_D = +67° (dioxan).

In the same manner there are obtained:

3-cyclopentyloxy-Δ³-5α-androstene-17-one;
3-isobutyloxy-Δ³-5α-androstene-17-one;
3-sec butyloxy-Δ³-5α-androstene-17-one;
3-n-amyloxy-Δ³-5α-androstene-17-one;
3-isoamyloxy-Δ³-5α-androstene-17-one;
3-n-hexyloxy-Δ³-5α-androstene-17-one;
3-(2'-methyl)-pentyloxy-Δ³-5α-androstene-17-one;
3-(4'-methyl)-pentyloxy-Δ³-5α-androstene-17-one;
3-(2'-ethyl)-butyloxy-Δ³-5α-androstene-17-one;
3-cyclohexyloxy-Δ³-5α-androstene-17-one;
3-benzyloxy-Δ³-5α-androstene-17-one;
3-phenyloxy-Δ³-5α-androstene-17-one.

Following the procedure of Example 5, the 3-ethoxy-Δ³-5α-androstene-17-one, is converted to 5α-androstane-4α and 4β-ol-3,17-dione.

Example 7

Following the procedure described in Example 1, the 3-cyclopentyl enolether of progesterone is catalytically hydrogenated in the presence of disodium phosphate to obtain 3-cyclopentyloxy-Δ³-5α-pregnene-20-one, M. Pt. 88–90.5° C.; [α]_D = +75° (dioxan 0.3%). In the same manner are prepared:

3-n-butyloxy-Δ³-5α-pregnene-20-one;
3-(4'-methyl)-pentyloxy-Δ³-5α-pregnene-20-one;
3-n-pentyloxy-Δ³-5α-pregnene-20-one;
3-n-heptyloxy-Δ³-5α-pregnene-20-one;
3-cyclohexyloxy-Δ³-5α-pregnene-20-one;
3-nonyloxy-Δ³-5α-pregnene-20-one;
3-decyloxy-Δ³-5α-pregnene-20-one and
3-benzyloxy-Δ³-5α-pregnene-20-one.

By further treatment of the above obtained 3-cyclopentyloxy-Δ³-5α-pregnene-20-one with monoperphthalic acid, there is obtained a mixture of 5α-pregnane-4α-ol-3,20-dione and 5α-pregnane-4β-ol-3,20-dione. The 4α and 4β-isomers are separated by chromatography on neutral alumina.

Example 8

2 g. of 3-ethyl enolether of cholestenone are hydrogenated in the presence of triethylamine and palladium on alumina as catalyst, thus obtaining 3-ethoxy-Δ³-cholestene, M. Pt. 64–67° C.; [α]_D = +25.5° (dioxan 0.3%).

Similarly, starting from the corresponding enolether, the 3-n-amyloxy, 3-cyclopentyloxy and 3-benzyloxy-Δ³-cholestene are prepared.

To a solution of 1 g. of 3-ethoxy-Δ³-cholestene in benzene, there is added 12 cc. of a 0.5 N solution of perbenzoic acid. After standing overnight at room temperature, the precipitate is separated by filtration and repeatedly recrystallized from ether-hexane to give 200 mg. of 5α-cholestane-4α-ol-3-one, M. Pt. 176–177° C.; [α]_D = +15° (chloroform).

Example 9

Following the procedure described in Example 1 and starting from the 3-ethyl enolether of 19-nor-testosterone 17-acetate, 3-ethoxy-19-nor-Δ³-5α-androstene-17β-ol-acetate is obtained, M. Pt. 95–97° C.; [α]_D = +32° (dioxan 0.5%) and successively converted to 19-nor-5α-androstane-4α,17β-diol-3-one 17-acetate.

Example 10

1 g. of 3-cyclopentyl enolether of 17α-acetoxy-progesterone, in solution in 10 cc. of tetrahydrofuran and 2 cc. of methanol, is hydrogenated following the procedure described in Example 4 to yield 3-cyclopentyloxy-17α-acetoxy-Δ³-5α-pregnene-20-one.

In the same manner are prepared:

3-cyclopentyloxy-Δ³-5α-pregnene-17α-ol-20-one;
3-cyclopentyloxy-Δ³-5α-pregnene-17α,21-diol-20-one;
3-cyclopentyloxy-Δ³-5α-pregnene-17α,21-diol-11,20-dione;
3-cyclopentyloxy-Δ³-5α-pregnene-11β,17α,21-triol-20-one;
3-cyclopentyloxy-Δ³-5α-pregnene-17α,21-diol-11,20-dione diacetate;
3-cyclopentyloxy-Δ³-5α-pregnene-17α,21-diol-20-one-diacetate.

Treatment of 3-cyclopentyloxy-17α-acetoxy-Δ³-5α-pregnene-20-one, in ether solution with a 0.3 N solution of monoperphthalic acid as in Example 4, provides 5α-pregnane-4α,17α-diol-3,20-dione 17-acetate.

Example 11

To 5 g. of 3-ethyl enolether of cortisone dissolved in 50 cc. of tetrahydrofuran there is added a solution of 10 mg. of sodium hydroxide in 10 cc. of methanol. The solution is hydrogenated in the presence of 1 g. of palladium on alumina suspended in 15 cc. of methanol. By operating as described in Example 1, 3-ethoxy-Δ³-5α-pregnene-17α,21-diol-11,20-dione is obtained.

Analogously, 3-isopropoxy-Δ³-5α-pregnene-17α,21-diol-11,20-dione, 3-isobutyloxy-Δ³-5α-pregnene-17α,21-diol-11,20-dione and 3-n-amyloxy-Δ³,5α-pregnene-17α,21-diol-11,20-dione are prepared, starting from the corresponding Δ³,⁵-diene ethers.

By treating 3-ethoxy-Δ³-5α-pregnene-17α,21-diol-11,20-dione with a solution of perbenzoic acid as in Example 8, 5α-pregnan-4α,17α,21-triol-3,11,20-trione is obtained.

Example 12

A mixture of 5 g. of isopropyl enolether of cortisol and 12 mg. of sodium phosphate in 20 cc. of ethanol is worked up as described in Example 7 to give 3-isopropoxy-Δ³-5α-pregnene-11β,17α,21-triol-20-one. This compound, treated with a solution of perbenzoic acid as in Example 8, gives 5α-pregnane-4α,11β,17α,21-tetrol-3,20-dione.

Example 13

2.5 g. of 3-butyl enolether of 17α-methyl-19-nortestosterone dissolved in 20 cc. of tetrahydrofuran are hydrogenated in the presence of pyridine, as in Example 1, to obtain 3-butyloxy-17α-methyl-19-nor-Δ³-5α-androstene-17β-ol. This compound treated with a solution of monoperphthalic acid at room temperature, gives 17α-methyl-19-nor-5α-androstane-4α,17β-diol-3-one.

Analogously, 3-cyclohexyl enolether of 17α-methyl-19-nortestosterone is hydrogenated under basic conditions to give 3-cyclohexyloxy-17α-methyl-19-nor-Δ³-5α-androstene-17β-ol and converted by treatment with monoperphthalic acid to 17α-methyl-19-nor-5α-androstane-4α,17β-diol-3-one.

Example 14

Substituting a stoichiometrically equivalent amount of 3-methyl enolether of 17α-methylestosterone for the 3-butyl enolether of 17α-methyl-19-nortestosterone in the above example, there is obtained 3-methoxy-17α-methyl-Δ³-5α-androstene-17β-ol.

Analogously, 3-(2'-ethyl)-butyloxy-17α-methyl-Δ³-5α-androstene-17β-ol and 3-phenoxy-17α-methyl-Δ³-5α-androstene-17β-ol are obtained.

3-methoxy-17α-methyl-Δ³-5α-androstene-17β-ol (2 g.) is then treated with 0.2 N solution of performic acid in 20 cc. of anhydrous tetrahydrofuran to give a mixture of 4α and 4β-isomers of 17α-methyl-5α-androstane-4,17β-diol-3-one from which the 4α-isomer is separated by recrystallization of the mixture from ether-hexane.

Example 15

5 g. of 3-cyclohexyl enolether of testosterone formate are hydrogenated catalytically in the presence of triethylamine as in Example 8, to form 3-cyclohexyloxy-Δ³-5α- androstene-17β-ol 17-formate, which by treatment with monoperphthalic acid is converted into 5α-androstane-4α,17β-diol-3-one 17-formate.

Example 16

Substituting a stoichiometrically equivalent amount of cyclohexyl enolether of testosterone oenanthate for the cyclohexyl enolether of testosterone formate in the above example, there is obtained 3-cyclohexyloxy-Δ$^3$-5α-androstene 17β-ol-oenanthate.

In the same manner, 3-cyclobutyloxy-Δ$^3$-5α-androstene-17β-ol-oenanthate and 3-cycloheptyloxy-Δ$^3$-5α-androstene-17β-ol-oenanthate are prepared. 3-cyclohexyloxy-Δ$^3$-5α-androstene-17β-ol-oenanthate obtained as above, is treated with monoperphthalic acid as in Example 2, to give 5α-androstane-4α,17β-diol-3-one 17-oenanthate.

Example 17

5 g. of 3-methyl enolether of 11-keto-progesterone (obtained by treating 11-keto-progesterone with methyl orthoformate) are hydrogenated catalytically in the presence of pyridine, following the procedure set forth in Example 1, to give 3-methoxy-Δ$^3$-5α-pregnene-11,20-dione. This compound (2 g.) is then treated with monoperphthalic acid in benzene solution and thus converted to 4α and 4β-hydroxy isomers of 5α-pregnane-4-ol-3,11,20-trione.

Example 18

By operating as in Example 17 and substituting a stoichiometrically equivalent amount of 3-ethyl enolether of 19-nor-progesterone for the 3-methyl enolether of 11-keto-progesterone, there is obtained 3-ethoxy-19-nor-Δ$^3$-5α-pregnene-20-one. This compound, treated with monoperphthalic acid, gives 4α and 4β-hydroxy-19-nor-5α-pregnane-3,20-dione.

Example 19

5 g. of 3-n-hexyl enolether of cortisone 21-oenanthate are hydrogenated catalytically in the presence of sodium acetate, to form 3-n-hexyloxy-Δ$^3$-5α-pregnene-17α,21-diol-11,20-dione 21 oenanthate. This compound, treated with monoperphthalic acid as in Example 2, gives 5α-pregnane-4α,17α,21-triol-3,11,20-trione 21-oenanthate.

What we claim is:

1. A process for preparing ethers of 3-hydroxy-Δ$^3$-5α-steroids of the formula:

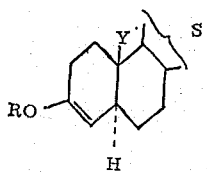

where S completes the steroid molecule, Y is a member selected from the group consisting of hydrogen and methyl and R represents a hydrocarbon radical selected from the group consisting of alkyl of from one to ten carbon atoms, cycloalkyl of from four to seven carbon atoms, benzyl and phenyl which comprises catalytically hydrogenating the corresponding enolethers of Δ$^4$-3-ketosteroids with a mole of hydrogen for each mole of the starting enolether in the presence of a catalytic amount of a basic substance.

2. A process as claimed in claim 1, in which said basic substance is selected from the group consisting of pyridine, piperidine, an alkylamine, sodium hydroxide, potassium hydroxide and ammonium hydroxide.

3. The process of claim 1, in which the ethers of 3-hydroxy-Δ$^3$-5α-steroids are further reacted and treated with an agent selected from the group consisting of an organic peracid and hydrogen peroxide to give the corresponding 4-hydroxy-3-keto-5α-steroids as a mixture of 4α and 4β-isomers.

4. The process of claim 3 in which said mixture of 4α and 4β-isomers is separated into its individual components.

5. Ethers of 3-hydroxy-Δ$^3$-5α-steroids having the formula:

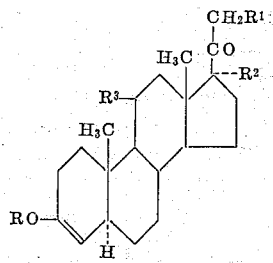

where R represents a hydrocarbon radical selected from the group consisting of alkyl of from one to ten carbon atoms, cycloalkyl of from four to seven carbon atoms, benzyl and phenyl, R$^1$ is a member selected from the group consisting of hydrogen, hydroxy and lower alkanoyloxy, R$^2$ is a member selected from the group consisting of hydrogen, hydroxy and acetoxy and R$^3$ is a member selected from the group consisting of hydrogen, β-hydroxy and ketonic oxygen.

6. Ethers of 3-hydroxy-Δ$^3$-5α-steroids having the formula:

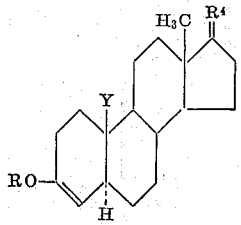

where R represents a hydrocarbon radical selected from the group consisting of alkyl of from five to ten carbon atoms and cycloalkyl of from four to seven carbon atoms, Y is a member selected from the group consisting of hydrogen and methyl and R$^4$ is a member selected from the group consisting of oxygen and the grouping

in which X is a member selected from the group consisting of hydrogen and lower alkanoyl and R$^5$ is a member selected from the group consisting of hydrogen and alkyl of from one to three carbon atoms.

7. 3-cyclopentyloxy-Δ$^3$-5α-androstene-17β-ol.

8. 3-cyclopentyloxy-Δ$^3$-5α-androstene-17β-ol propionate.

References Cited by the Examiner

UNITED STATES PATENTS 3,083,199  3/1963  Caglioti et al. ____ 260—239.55
3,118,917  1/1964  Ercoli et al. _____ 260—397.5

LEWIS GOTTS, *Primary Examiner.*